No. 839,380. PATENTED DEC. 25, 1906.
E. T. GREENFIELD.
HOSE.
APPLICATION FILED OCT. 25, 1905.
2 SHEETS—SHEET 1.
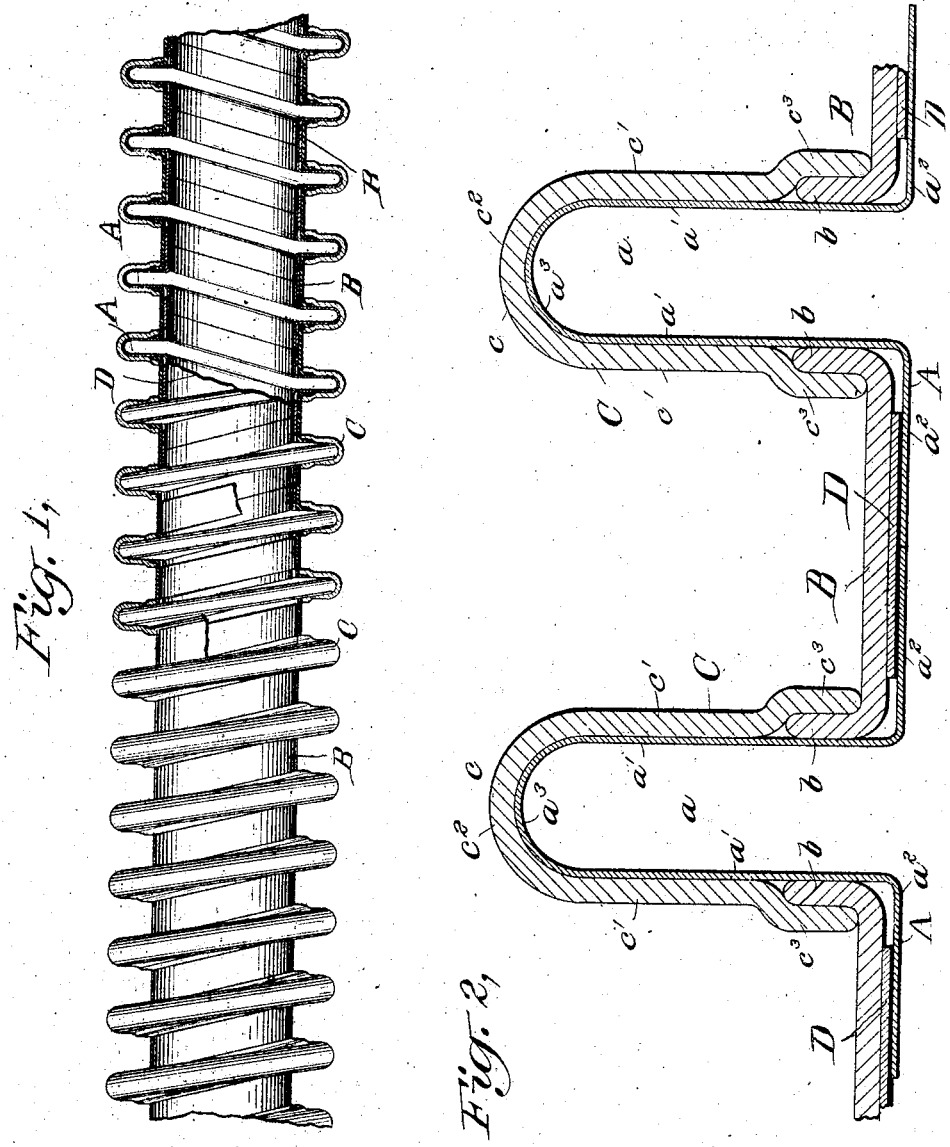
WITNESSES:
INVENTOR.
Edwin T. Greenfield
BY
ATTORNEY No. 839,380. PATENTED DEC. 25, 1906.
E. T. GREENFIELD.
HOSE.
APPLICATION FILED OCT. 25, 1905.
2 SHEETS—SHEET 2.
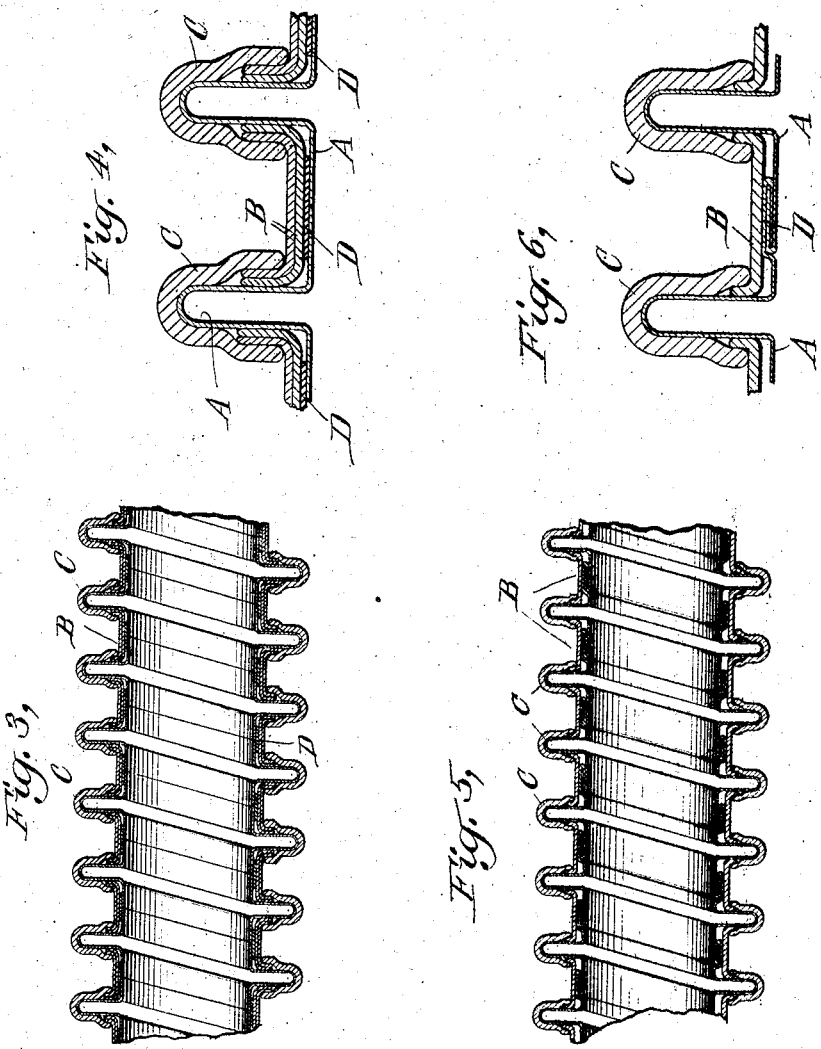
WITNESSES:
INVENTOR
BY
ATTORNEY

UNITED STATES PATENT OFFICE.

EDWIN T. GREENFIELD, OF KIAMESHA, NEW YORK.

HOSE.

No. 839,380.      Specification of Letters Patent.      Patented Dec. 25, 1906.

Application filed October 25, 1905. Serial No. 284,393.

*To all whom it may concern:*

Be it known that I, EDWIN T. GREENFIELD, a citizen of the United States, and a resident of Kiamesha, in the county of Sullivan and State of New York, have invented certain new and useful Improvements in Hose, of which the following is a specification.

The object of the invention is to provide a tube or hose which, while capable of other uses, shall be particularly adapted for the control and passage of steam or other fluid agent.

A further object is to so construct a hose designed for this use that the same shall possess requisite flexibility and lightness without sacrifice of strength and durability.

A further object is to provide for adequately sealing the hose so constructed to guard against the escape of the fluid agent passed therethrough.

In carrying out the invention in a preferred form with these ends in view I construct the hose wholly of metal, this being in the form of elongated strips, which, or certain of which, may be previously crimped or curved laterally to provide for the proper coaction of all of such strips with another. These strips are formed into successive interlocking spirals, the edges being in substantially parallel adjustment, but so arranged relatively to each other as to permit readily flexing or bending the hose while in use. The hose comprises an inner series of spirals, formed, preferably, of copper, the adjacent edges thereof being secured together, preferably, in such manner as to effect a seal. The spirals of this series are provided with a circumferential flange open to the interior of the series, the sides whereof may be readily moved toward or from each other. The hose further comprises an outer series of spirals, preferably of steel, having angular edges terminating close to the sides of the circumferential flanges of two adjacent spirals of the inner series. It further comprises a second outer series of spirals, also preferably of steel and substantially U-shaped in cross-section, each of these coacting with the flange of one of the inner series of spirals and with the angular edge of each of two adjacent spirals of the first outer series, thereby holding the latter, as well as the sides of said flanges, securely against excessive movement in opposite directions, but permitting freedom of movement of such parts toward each other as the hose is bent or curved. In a hose so constructed there is substantially no deterioration due to the flexing thereof in use. The tendency of the construction is to maintain the hose in a single plane. Upon overcoming this tendency to bend the hose in any direction the distorting or disrupting of the several parts is, by the means described, wholly precluded, such parts instantly returning to normal position as the hose is straightened out.

The invention is illustrated in the accompanying drawings, in which—

Figure 1 is a side elevation, partly in section, of a hose constructed in accordance with my invention. Fig. 2 is an enlarged section of the construction shown in Fig. 1. Fig. 3 is a section, and Fig. 4 an enlarged section, illustrating a modification with regard to one of the outer series of spirals; and Fig. 5 is a section, and Fig. 6 an enlarged section, illustrating a modification with regard to the joint between the edges of two adjacent spirals of the inner series.

Referring to the drawings, in which similar letters denote corresponding parts, A A designate the spirals of the inner series. These are here shown as formed from a continuous strip of metal, (preferably copper having some degree of resiliency.) Such strip prior to being formed into the spirals shown is provided with a longitudinal groove or channel $a$ of substantial depth, the sides $a'$ $a'$ thereof extending approximately at a right angle to the portions $a^2$ $a^2$ of the strip on either side thereof. As a result when the strip so grooved or channeled is formed into the successive spirals shown in Fig. 1 the exterior of the series presents a circumferential and preferably continuous flange, the sides thereof being at right angles to the longitude of the tube.

The adjacent edges of each two successive spirals A of the series are secured together or sealed in a suitable manner. For this purpose I have shown in Figs. 1, 2, 3, and 4 a sealing-strip D, preferably of tinned copper, overlying the butt-joint between the adjacent edges of each two successive spirals A A. Preferably the application of this sealing-strip as described will follow immediately the forming of the spirals A A, said strip being permanently secured in place, as by the soldering process, as it is applied. In Figs. 5 and 6 the adjacent edges of each two spirals are shown as secured together by means of a lap-andfold joint, and this may be made permanent by pressure alone or by the additional provision of solder, if desired.

B B designate the spirals of one of the outer series. Like the spirals A A, these are here shown as formed from a continuous strip of metal, (preferably steel,) and prior to being curved into the spirals shown the lateral edges of such strip are flanged outwardly at $b\ b$ substantially at right angles to the intermediate portion. Each of these spirals B B is of such width that on being formed as shown in the drawings the external faces of the flanges $b\ b$ shall bear against or extend into proximity to the external faces of two adjacent spiral flanges $a\ a$, thereby aiding in determining the degree of movement of such flanges toward each other.

C C designate the spirals of the second outer series. Like the spirals A A and B B, these are here shown as formed from a continuous strip of metal, (preferably steel,) and prior to being curved into the spirals shown such strip is provided with a groove or channel of substantial depth, which after the strip has been wrapped or bent to the conformation illustrated presents an outwardly-extending flange $c$, corresponding generally in size and shape to, although a trifle larger than, the circumferential flange $a$ of the inner series of spirals A A. Said spirals C C are, as shown in the drawings, formed partly upon said flange $a$ and partly upon the outwardly-extending angular edges $b\ b$ of the spirals B B. The preferred construction in this regard is that illustrated on enlarged scale in Fig. 2. Here, as will be seen, the sides $c'\ c'$ and end $c^2$ of the flange $c$ closely encircle the sides $a'\ a'$ and end $a^3$ of the flange $a$. Near their edges the sides $c'\ c'$ of each spiral C may be offset, ($c^3$,) so as to snugly receive between them and the sides $a'\ a'$ of the flange $a$ the outturned edges $b\ b$ of the two adjacent spirals B B.

The foregoing description applies generally to the construction shown in all of the figures of the drawings. It is apparent, however, that the detail of such construction may be modified to meet particular conditions without departing from the invention or sacrificing the advantages inherent therein. Thus in Figs. 3 and 4 I have shown a construction in which instead of employing a single strip for each of the series B and C of outer spirals, such strips being of substantially the same thickness, I employ for one of the spirals (in this instance the spirals B) two parallel and preferably simultaneously-formed strips, each approximately one-half the thickness of the coacting spirals C.

Among the important advantages which characterize the invention attention is called to the following: The hose made in accordance therewith possesses great strength and particularly power of resistance to internal pressure, and this is not sacrificed in the attainment of flexibility. In bending the hose the sides $a'\ a'$ of the spiral flange $a$ are free to move toward each other a distance predetermined with regard to the character and thickness of the metal employed in such flange. Excessive movement of such sides in the opposite direction, however, which would subject the structure to undue strain, is prevented by the sides $c'\ c'$ of the flange $c$ and in the particular embodiment of the invention here shown by the outturned edges $b\ b$ of the spirals B. Again, the hose is absolutely steam and water tight, the adjacent edges of the inner spirals being so securely sealed as to make such spirals, in effect, practically an integral structure. Added to this is the fact that the tendency of the fluid-pressure within the hose is more in the direction of preserving the integrity of the union between the spirals than in that of destroying it.

What I claim is—

1. A series of integral metallic spirals having a circumferential flange open to the interior, the sides of which are movable one relatively to the other, and means for precluding excessive relative movement of the sides of said flange, substantially as described.

2. The combination of a series of integral metallic spirals having a circumferential flange open to the interior, the sides of which are movable one relatively to the other, and a series of overlying metallic spirals coacting with said flange to preclude excessive relative movement of the sides thereof, substantially as described.

3. A series of metallic spirals sealed at their adjacent edges, each having a circumferential flange open to the interior, the sides of which are movable one relatively to the other, and means for precluding excessive relative movement of the sides of each of such flanges, substantially as described.

4. The combination with a series of metallic spirals sealed at their adjacent edges, each having a circumferential flange open to the interior of the series, of an overlying flexible metallic covering including means for precluding excessive movement of the sides of said flanges relatively to each other, substantially as described.

5. A series of integral metallic spirals, the adjacent edges thereof being sealed, a circumferential flange, open to the interior of said series, formed in said spirals and a flexible metallic covering coacting with said series of spirals, substantially as described.

6. A series of integral metallic spirals, the adjacent edges thereof being sealed, a continuous circumferential flange, open to the interior of said series, formed in said spirals and a flexible metallic covering coacting with said series of spirals, substantially as described.

7. A series of integral metallic spirals, the adjacent edges thereof being sealed, a circumferential flange, open to the interior of said series, formed in said spirals and a series of integral metallic spirals, overlying the series first named and coacting with said flange, substantially as described.

8. A series of integral metallic spirals, the adjacent edges thereof being sealed, a circumferential flange, open to the interior of said series, formed in said spirals, and a series of integral metallic spirals overlying the series first named and corresponding generally in cross-sectional configuration with that of the spirals of said first-named series, substantially as described.

9. A series of integral metallic spirals, the adjacent edges thereof being sealed, a circumferential flange, open to the interior of said series, formed in said spirals and a series of integral spirals overlying the series first named between the flanges formed on each two adjacent spirals of said first-named series, substantially as described.

10. A series of integral metallic spirals, the adjacent edges thereof being sealed, a circumferential flange, open to the interior of said series, formed in said spirals and a series of integral spirals, having outwardly-extending lateral edges, overlying the series first named between the flanges formed on each two adjacent spirals of said first-named series, substantially as described.

11. A series of integral metallic spirals, the adjacent edges thereof being sealed, a circumferential flange, open to the interior of said series, formed in said spirals, a second series of spirals overlying the series first named between the flanges thereof and a third series of spirals coacting with the spirals of said first-named series and with those of said second series, substantially as described.

12. A series of integral metallic spirals, the adjacent edges thereof being sealed, a circumferential flange, open to the interior of said series, formed in said spirals, a second series of spirals having outwardly-turned lateral edges and overlying the series first named between the flanges thereof and a third series of spirals overlying and coacting with the spirals of both said first-named series and of said second series, substantially as described.

13. A series of metallic spirals, the adjacent edges thereof being sealed, a circumferential flange, open to the interior of said series, formed in said spirals, a second series of spirals having outwardly-turned lateral edges and overlying the series first named between the flanges thereof and a third series of spirals overlying the two series before mentioned, the edges thereof coacting with the outwardly-turned edges of the spirals of said second series, substantially as described.

14. A series of metallic spirals, the adjacent edges thereof being sealed, a circumferential flange, open to the interior of said series, formed in said spirals, a second series of spirals having outwardly-turned lateral edges and overlying the series first named between the flanges thereof and a third series of spirals overlying the two series of spirals before mentioned, the same embracing the exterior of said flange and the edges thereof coacting with the outwardly-turned edges of the spirals of said second series, substantially as described.

15. A series of metallic spirals each having a circumferential flange formed therein open to the interior and portions on either side of said flange extending outwardly therefrom, and a sealing-strip coacting with said portions of adjacent spirals of said series, substantially as described.

16. A series of metallic spirals having a circumferential flange, open to the interior of said spirals, formed therein, a sealing-strip coacting with adjacent spirals of said series and a flexible, metallic covering overlying said strip and spirals, substantially as described.

This specification signed and witnessed this 17th day of October, 1905.

EDWIN T. GREENFIELD.

Witnesses:
 S. O. EDMONDS,
 D. S. EDMONDS.